US008047123B2

(12) United States Patent
Lahrman

(10) Patent No.: US 8,047,123 B2
(45) Date of Patent: Nov. 1, 2011

(54) COOLING GALLERY INSERT FOR A PISTON

(75) Inventor: John C. Lahrman, Muskegon, MI (US)

(73) Assignee: Mahle Engine Components USA, Inc., Muskegon, MI (US)

( * ) Notice: Subject to any disclaimer, the term of this patent is extended or adjusted under 35 U.S.C. 154(b) by 548 days.

(21) Appl. No.: 11/952,516

(22) Filed: Dec. 7, 2007

(65) Prior Publication Data

US 2009/0145295 A1 Jun. 11, 2009

(51) Int. Cl.
*F16J 1/09* (2006.01)
*F16J 1/18* (2006.01)

(52) U.S. Cl. ................................ 92/186; 92/187; 92/216

(58) Field of Classification Search ............ 92/186–188, 92/212, 216
See application file for complete search history.

(56) References Cited

U.S. PATENT DOCUMENTS 1,838,901 A * 12/1931 Blackmore ..................... 92/187
3,115,070 A * 12/1963 Tsang ............................. 92/212
4,044,731 A * 8/1977 Lindner .......................... 92/186

* cited by examiner

*Primary Examiner* — Daniel Lopez
(74) *Attorney, Agent, or Firm* — Rader, Fishman & Grauer PLLC

(57) ABSTRACT

A piston assembly for an internal combustion engine is provided, including a piston and at least one insert. The piston includes an annular recess, a first surface, a ring belt and a skirt. The annular recess is located between the ring belt and the skirt. The insert may include a longitudinal portion and one or more opposing arms. The insert may be configured to be coupled with the piston. The arm(s) may extend laterally from the longitudinal portion and may be configured to abut the skirt, thereby orienting the insert relative to the piston. The insert may be disposed along the first surface, and aligned with the piston skirt such that the arms of the insert form a circumference about the piston skirt. The arms may at least partially enclose the annular recess at the piston skirt.

19 Claims, 4 Drawing Sheets

COOLING GALLERY INSERT FOR A PISTON

TECHNICAL FIELD

The present disclosure relates to a piston assembly for an internal combustion engine, and lubrication systems for pistons.

BACKGROUND

Pistons employed in internal combustion engine applications must withstand high temperatures. To reduce the temperature of piston components, especially adjacent the combustion chamber, a cooling gallery may be provided within the piston crown. The cooling gallery is typically formed by an interior volume located within the piston crown and is covered with a piston crown bottom cover. The piston crown bottom cover is typically located along a lower surface of the piston crown.

A nozzle directing a flow of oil to the cooling gallery is typically located between the piston ring belt portion and the piston skirt. The oil flows into the cooling gallery through an aperture in the piston. The reciprocating motion of the piston generally moves the oil back and forth within the piston cooling gallery, thereby removing at least part of the heat of the piston ring belt portion and the combustion chamber. The heated oil typically exits the cooling gallery through the aperture located between the piston ring belt portion and the piston skirt and/or one or more auxiliary drain apertures, while fresh oil is supplied by the nozzle.

Internal combustion engines, particularly heavy-duty diesel engines, include stringent cooling requirements due to the elevated combustion pressure and temperature within the combustion chamber. Moreover, to improve engine performance it has become increasingly desirable to operate engines at even higher combustion pressures and temperatures. Unfortunately, the existing cooling gallery formed inside of the interior volume of the piston crown may not always be able to meet the increasing cooling requirements needed.

Accordingly, there exists a need for a piston lubrication system that will provide enhanced cooling properties when compared to the current piston lubrication systems that are available today.

DETAILED DESCRIPTION

Figure 1:
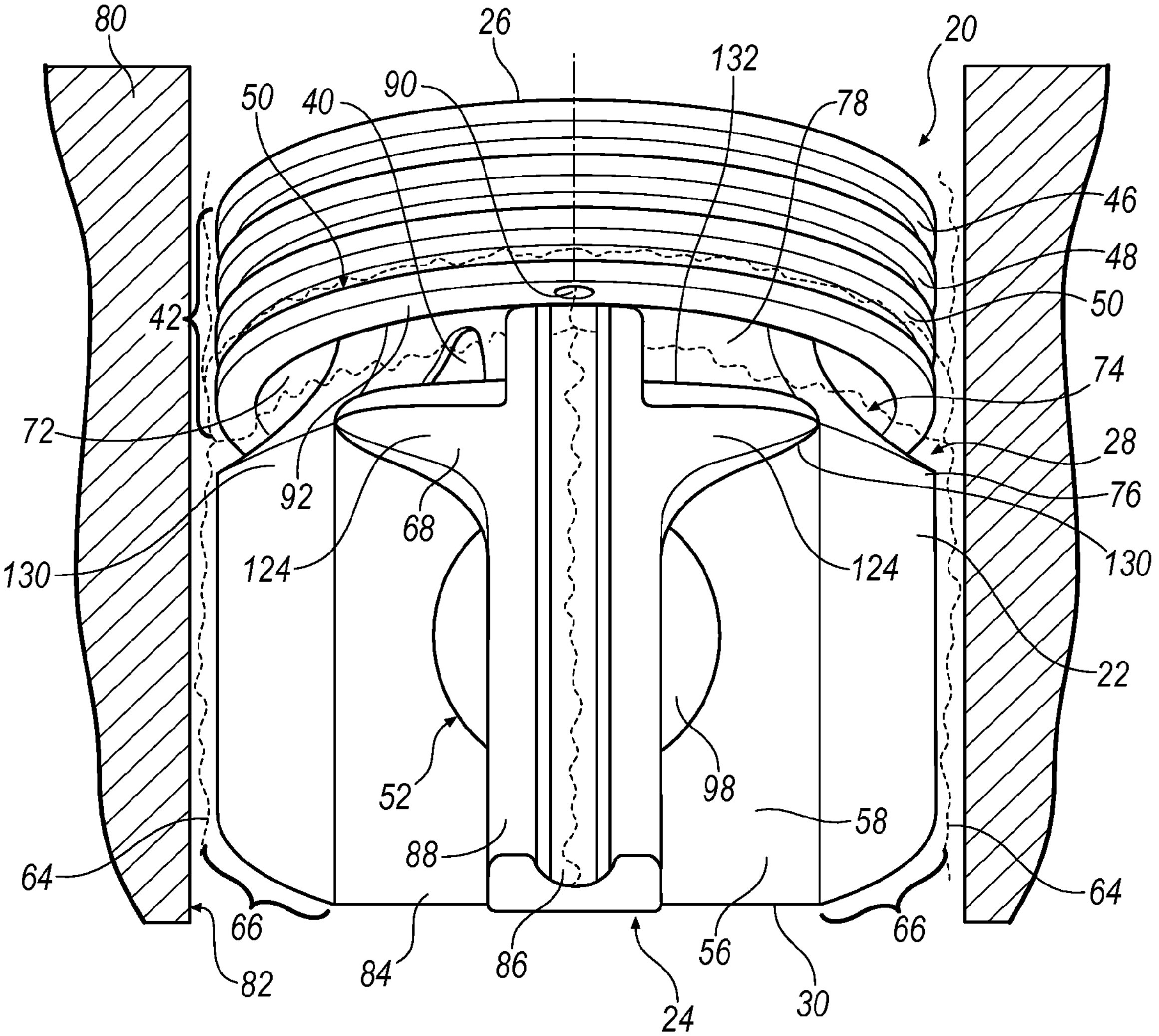
FIG. 1 is a perspective view of a piston and an insert inside of a cylinder of an engine.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

Moreover, there are a number of constants introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

According to various exemplary illustrations described herein, a piston assembly is provided that includes a ring belt, a skirt, and an annular recess disposed therebetween. At least one insert coupled with the piston is included. The insert may include a longitudinal portion extending between the ring belt and the skirt. The insert may further include one or more arms extending away from the longitudinal portion and abutting the skirt, thereby orienting the insert relative to the piston. The insert may be disposed along a first, substantially planar surface region of the piston that extends along an outer surface of the skirt. The insert may be aligned with the piston skirt such that the arms of the insert form a circumference about the piston skirt, and at least partially enclose the annular recess at the piston skirt. The insert may, alternatively or in addition to the arms, include a channel defined in the longitudinal portion that allows fluid communication between a ring groove disposed in the ring belt and the skirt area.

Figure 3:
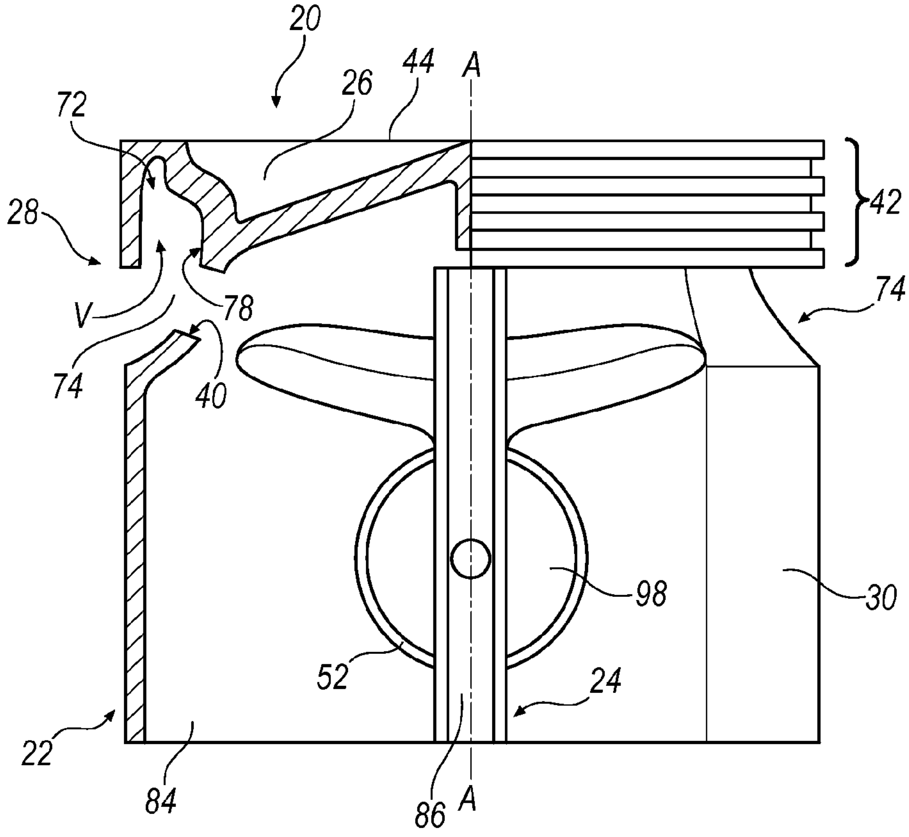
FIG. 3 is a is a partially cross sectioned view of the piston and the insert illustrated in FIG. 1.
Figure 4:
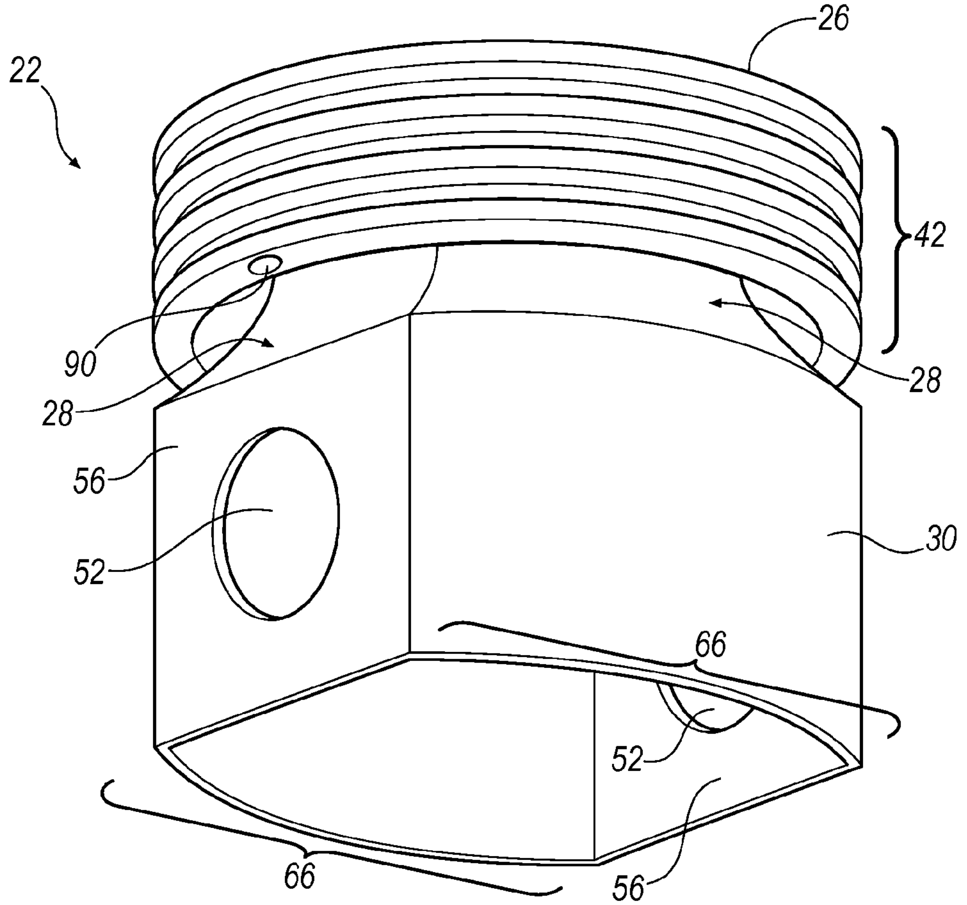
FIG. 4 is an perspective view of the piston without the inserts.

FIG. 1 illustrates a piston assembly 20, including a piston 22 and an insert 24. The piston 22 is located inside of a cylinder 80. The piston 22 includes a piston crown 26, a panel area 28 and a piston skirt 30. As best shown in FIGS. 1, 3 and 4, the panel area 28 is located between the piston crown 26 and the piston skirt 30. The panel area 28 includes an aperture 40 for receiving fluid sprayed from a nozzle (not shown), e.g., engine oil. The piston crown 26 includes a ring belt portion 42 including a plurality of ring grooves for receiving one or more piston rings (not shown) therein. In particular, the ring belt portion 42 includes a first ring groove 46, a second ring groove 48 and a third ring groove 50. Any of the first, second or third ring grooves 46, 48 or 50 can accommodate a piston ring or oil control ring (not shown).

As best seen in FIGS. 1 and 4, the piston skirt 30 includes a substantially planar surface region 56. The planar surface region 56 extends along a generally outer surface 58 of the piston skirt 30. The piston skirt 30 includes a pair of wrist pin bore openings 52 for receiving a wrist pin (not shown). Two planar surface regions 56 may be provided on opposing sides of the piston 22, adjacent the wrist pin bore openings 52. FIG. 1 illustrates the planar surface region 56 extending from a bottom portion 76 of the panel area to a bottom end 84 of the piston skirt 30.

Figure 2:
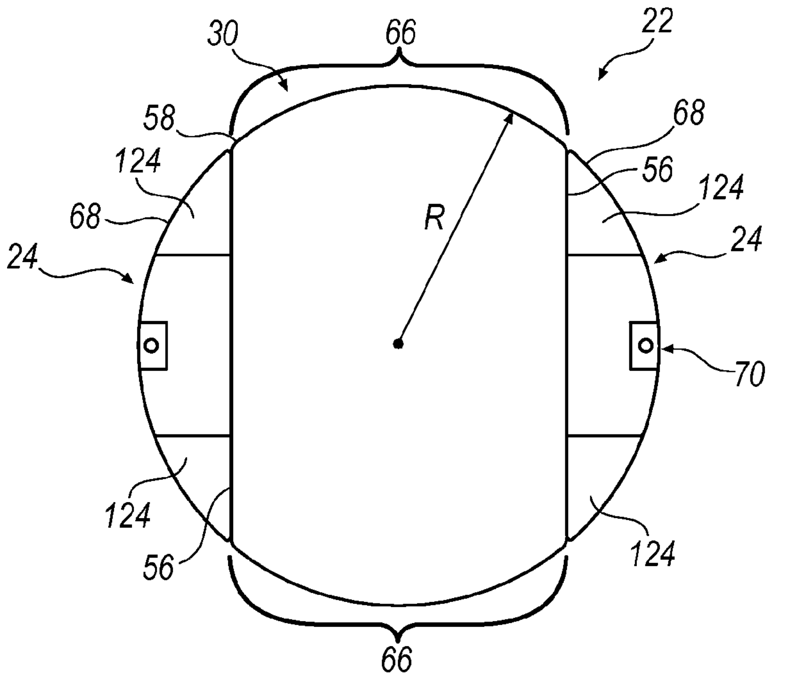
FIG. 2 is a bottom view of the piston with the two inserts.

FIG. 2 is a bottom view of the piston 22 and the pair of inserts 24. Two of the inserts 24 are disposed on opposing sides of the piston 22. A portion of the outermost surface 58 of the piston skirt 30 includes an arcuate profile. That is, the piston skirt 30 may include two arcuate portions 66, and the planar surface regions 56. An outer arcuate surface 68 of each of the inserts 24 cooperates with the arcuate portion 66 of the piston skirt 30 to form a perimeter extending about piston 22, forming a generally cylindrical circumference 70 of piston assembly 20. That is, the generally cylindrical circumference 70 includes the outermost surface 58 of the piston skirt 30 and the outer surface 68 of the inserts 24. In one exemplary approach, the arcuate portions 66 and the outer arcuate surfaces 68 58 share a common center region such that a radius "R" defined by circumference 70 is generally constant. The inserts 24 cooperate with the piston skirt 30 to further form an enclosed annular recess for receiving fluid along the panel area 28, as discussed in greater detail below.

FIG. 3 is a partially cross sectioned view of the piston 22, including a sectional view of the piston crown 26 and a combustion bowl 44. A cooling gallery 72 is formed within the piston 22, and particular within the piston crown 26. More specifically, the cooling gallery 72 includes an interior volume V located within the piston crown 26 adjacent the ring belt portion 42.

The cooling gallery 72 may generally facilitate cooling of the piston 22. The cooling gallery 72 is in fluid communication with one or more nozzles (not shown) for directing fluid, e.g., engine oil, into the piston crown 26. This fluid will cool the inside walls of the cooling gallery 72 as a result of the rapid reciprocating motion typical of pistons for internal combustion engines during operation. The fluid that is introduced into the cooling gallery 72 may be permitted to escape through the aperture 40 for drainage back into the crank case of the engine (not shown). The fluid will also be able to drain towards the bottom end 84 of the piston skirt 30 around the outer surfaces or perimeter of piston 22, at least to the extent allowed by arms 124, as further described below. Moreover, the fluid may escape from cooling gallery 72 by way of a longitudinal channel 86 located along the insert 24, as discussed in greater detail below.

An annular recess 74 may generally be formed by an annular wall 78 of the panel area 28. The annular recess 74 is located between the ring belt portion 42 and the skirt 30. The cooling gallery 72 is in fluid communication with the annular recess 74. That is, when the piston 22 is placed inside of a cylinder, such as cylinder 80 as illustrated in FIG. 1, the annular recess 74 and the cooling gallery both accumulate fluid during operation of the piston 22 within an internal combustion engine (not shown). Therefore, both of the cooling gallery 72 and the annular recess 74 contain fluid that cools the piston 22.

Turning back to FIG. 1, the piston assembly 20 may include a fluid 64 around the annular recess 74 that is cooled by a wall 82 of the cylinder 80, or when it is carried away from piston assembly 20, e.g., passed through a cooling device. The fluid 64 may include any liquid or gas that is able to cool or otherwise carry heat away from the piston 22, such as, but not limited to, engine oil, coolant, or the like. The fluid 64 cools the annular wall 78 of the panel area 28 and the outermost surface 58 of the piston skirt 30. The fluid may be manipulated about the piston 22 by the reciprocating motion of the piston 22 typical for internal combustion engine applications. Thus, the fluid 64 that is located along the panel area 28 is further cooled by the cylinder walls 82. The fluid 64 that is introduced between the piston 22 and the cylinder wall 82 drains along the piston skirt 30 and back into a crank case of an engine (not shown).

The insert 24 may include a pair of opposing arms 124 extending laterally from the channel 86 to abut the skirt 30, thereby generally orienting the insert 24 relative to the piston 22. That is, the insert 24 is disposed along the planar surface region 56 and is circumferentially aligned with the piston skirt 30. Thus, as best seen in FIG. 2, the insert 24 is aligned with the skirt 30 such that the arms 124 of the insert 24 cooperate with the skirt 30 to form a perimeter about the skirt 30.

The arms 124 at least partially enclose the annular recess 74 at the piston skirt 30. That is, when the piston 22 is assembled inside the cylinder 80, the planar surface region 56 is aligned with the arcuate portion 66 along an upper portion 130 of the planar surface region 56. Thus, an upper surface 132 of the arms 124 of the insert 24 enclose the annular recess 74. When the panel area 28 is at least partially enclosed, the annular recess 74 is able to more effectively retain fluid along the panel area 28, generally increasing a cooling capacity of piston assembly 20. The fluid 64 that is retained along the panel area 28 is cooled by the walls 82 of the cylinder 80 by the reciprocating motion of the piston 22 when in operation.

The insert 24 may, alternatively or in addition to arms 124, include the channel 86. The channel 86 generally drains fluid from the piston 22 along a longitudinal portion 88 of the insert 24. At least one aperture 90 may be formed along the ring belt portion 42. More specifically, the aperture 90 is formed in a ring belt bottom surface 92, generally adjacent at least one of ring grooves 46, 48 or 50. That is, one of the ring grooves 46, 48 or 50 cooperates with the ring belt bottom surface 92 to define the aperture 90 therebetween. The insert 24 is constructed from any material that is able to withstand the elevated temperatures of an engine combustion chamber, such as, but not limited to, ferrous materials such as aluminum, steel, or the like, a heat-resistant polymer, etc.

The aperture 90 is in fluid communication with the channel 86. The fluid located within the channel 86 is directed towards the bottom end 84 of the piston skirt 30 of the piston 22, and is then drained into a crankcase of an engine (not shown). Although FIG. 1 illustrates the aperture 90 extending from only the third ring groove 50, it should be noted that the aperture 90 may also extend from the second ring groove 48 and the first ring groove 46 as well.

As illustrated in FIGS. 1 and 3, insert 24 may be coupled with piston 22 with a wrist pin cover 98 formed integrally with insert 24. In other words, insert 24 may be shaped to define a wrist pin cover 98 that is received by one of the wrist pin bore openings 52. Because the wrist pin cover 98 is included with the insert 24, this generally eliminates the need for a separate wrist pin cover. Additionally, the wrist pin cover 98 also eliminates the need for separate lock rings inside of the wrist pin bore openings 52 to secure a wrist pin (not shown) in place. The wrist pin cover 98 also generally provides a visual confirmation to an assembly operator that the insert 24 is properly assembled to the piston 22 inside the cylinder 80. That is, because the insert 24 is easily seen from outside the cylinder 80, a visual check is possible to ensure that a wrist pin bore is secured in place. A traditional wrist pin securing device, such as a lock ring, does not generally allow for a user to visually check the piston 22 when inside the cylinder 80 to ensure that the lock ring is in place. If a securing device is not installed into the wrist pin bore openings 52, during engine operation the wrist pin will travel outside of the wrist pin bore openings 52, thereby scouring the wall 82 of the cylinder 80. Although insert 24 is illustrated herein as having an integrally formed wrist pin cover 98 for coupling insert 24 to piston 22, any other method of securing or coupling insert 24 to piston 22 may be employed. For example, insert 24 may be mechanically fastened to piston 22, e.g., by bonding, mechanically fastening with one or more bolts, screws, etc. Such bonding and/or mechanical fastening may additionally support insert 24, thereby generally further preventing rotation or translation of insert 24 with respect to piston 22, especially in embodiments where arms 124 are not provided.

FIG. 4 is an illustration of the piston 22, prior to installation of one or more inserts 24. As best seen in FIG. 4, the piston skirt 30 includes two arcuate portions 66, and the two planar surface regions 56 located along the wrist pin bore openings 52. The inserts 24 are placed along the planar surface regions 56 of the piston 22, thereby cooperating with the shape of piston skirt 30 to form a generally circular outer perimeter, as best seen in FIG. 2.

The insert 24 may generally provide at least two different benefits to piston assembly 20 to facilitate movement of the fluid 64 throughout the piston assembly 20 and promote cooling thereof. First, the arms 124 may at least partially enclose the panel area 28, thereby retaining fluid within the annular recess 74, and generally inhibiting or entirely preventing fluid from escaping annular recess 74 through the gap between piston 22 and cylinder wall 82 adjacent planar surface regions 56. Accordingly an overall cooling capacity of piston assembly 20 is generally increased as compared with piston assemblies that generally freely allow cooling fluid to escape the cooling gallery. Second, channel 86 that is located along a longitudinal portion 88 of the insert 24 is in fluid communication with the aperture 90 of the piston 22. Accordingly, the channel 86 may drain any excess fluid 64 that may reach ring belt portion 42, or become trapped within any of ring grooves 46, 48, 50, thereby reducing the amount of fluid that may escape into the combustion bowl 44.

Insert 24 may include both the channel 86 and the arms 124, thereby providing each of the benefits described above. Alternatively, an insert 24 may be provided that only includes the arms 124, and does not include the channel 86, or vice versa. The channel 86 may be particularly useful for embodiments utilizing arms 124, as these embodiments generally retain a greater amount of fluid within the cooling gallery 72. Channel 86 generally provides a return path for fluid that accumulates within the cooling gallery to an engine crankcase (not shown).

Figure 5:
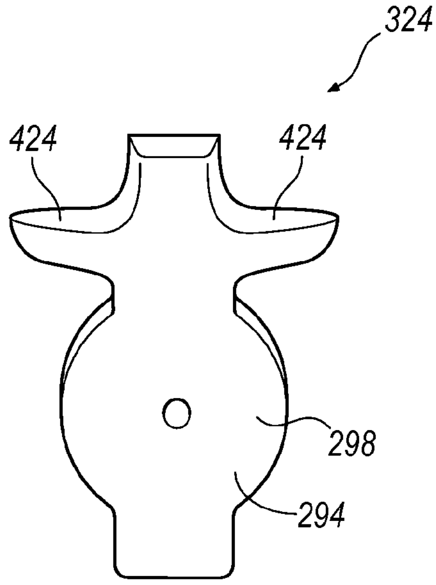
FIG. 5 is an alternative illustration of the insert without the piston.

FIG. 5 is an alternative illustration of the insert 324, excluding the channel 86 and including only arms 424. Arms 424 at least partially enclose the panel area 28, thereby allowing for the piston 22 to retain a maximum amount of fluid 64 within the annular recess 74. More specifically, as discussed above, the arms 424 at least partially enclose the annular recess 74 at the piston skirt 30, generally inhibiting or preventing fluid 64 from falling back into the engine crankcase through a gap between piston 22 and cylinder walls 82 adjacent planar surface regions 56 of piston 22. Fluid 64 is therefore conducted back to the engine crankcase (not shown) primarily through aperture(s) 40. Insert 324 may be coupled with or secured to a piston with a wrist pin cover 298, however, it should be noted that other methods may be used as well, e.g., mechanical bonding or fastening as described above. It is also understood that if the insert 324 is used, the piston 22 does not require the aperture 90, although the aperture 90 may be included if desired. More specifically, because the insert 324 does not include the channel 86, fluid 64 must generally drain back to an engine crankcase (not shown) only by way of nozzles 40. Fluid 64 may additionally be allowed to fall back into the engine crankcase (not shown) from aperture 90, along any gap that may be provided between piston 22 and cylinder walls 82. It should be noted that if the channel 86 is included with the insert 324, the amount of fluid that is drained from the cooling gallery 72 into the crankcase (not shown) will generally be maximized. That is, including the aperture 90 with the piston 22, and including the channel 86 with the insert 324 will maximize the amount of fluid drained from the cooling gallery 72.

Figure 6:
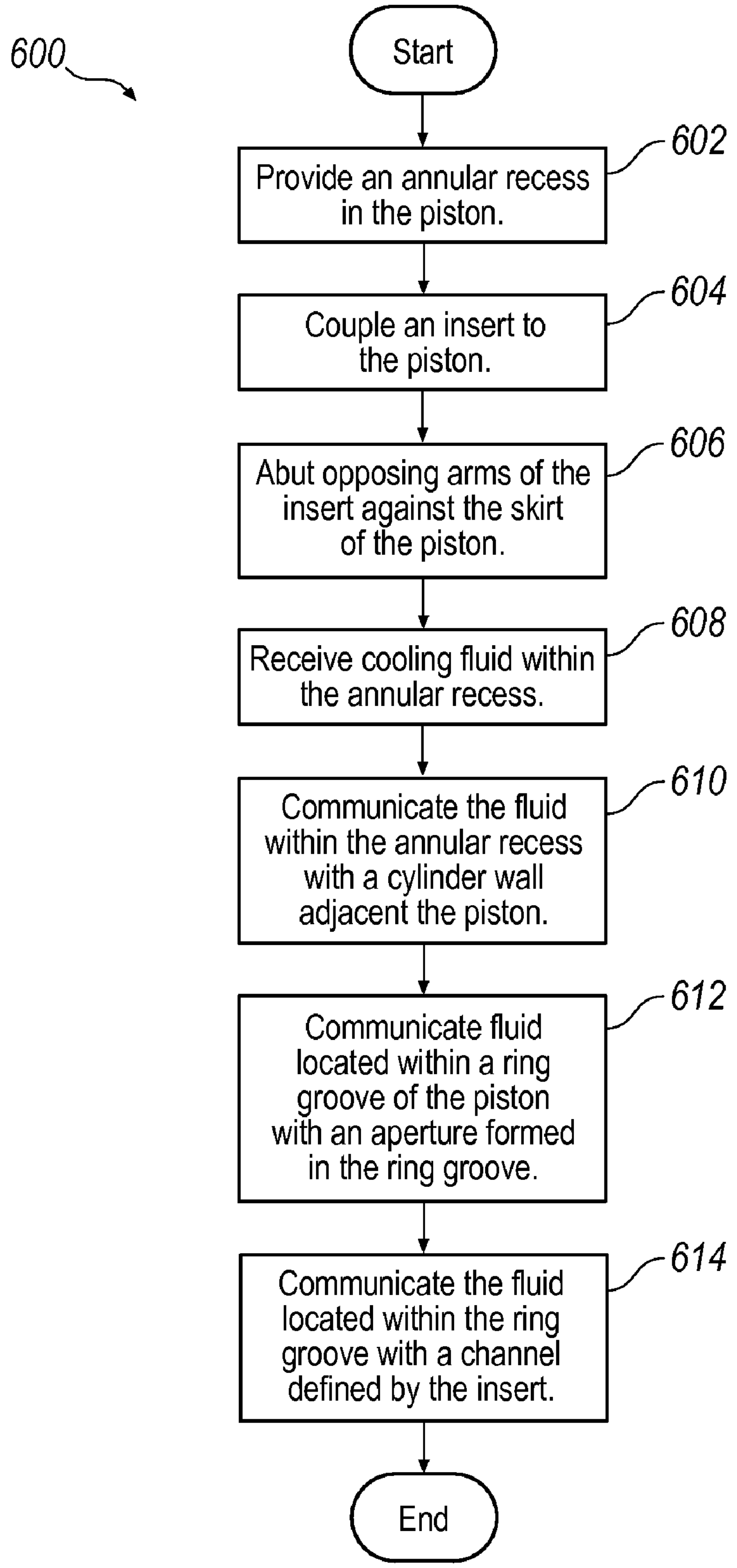
FIG. 6 is an alternative illustration of the insert without the piston.

Turning now to FIG. 6, a process 600 for cooling a piston is illustrated. Process 600 may begin with step 602, which is providing an annular recess between a ring band of the piston and a skirt of the piston. For example, as described above, a piston 22 may be formed that has a cooling gallery 72 disposed between a ring band 42 and a skirt 30 of piston 22. Process 600 may then proceed to step 604.

In step 604, an insert is coupled to the piston, the insert including a pair of opposing arms extending laterally from a longitudinal portion of the insert. For example, as described above, an insert 24 may be coupled with a piston 22 at a wrist pin bore 52. Alternatively, an insert 24 may be mechanically secured to piston 22. Process 600 may then proceed to step 606.

In step 606, the opposing arms of the insert are abutted against the skirt of the piston, thereby at least partially enclosing the annular recess of the piston with the arms of the insert. For example, as described above, arms 124 may be provided that abut piston 22 to partially enclose a cooling gallery 72 of piston 22. Process 600 may then proceed to step 608.

In step 608, a cooling fluid is received within the annular recess. For example, engine oil may be received within the cooling gallery 72 through a nozzle 40 of piston 22, as described above. Process 600 may then proceed to step 610.

In step 610, the fluid within the annular recess is communicated with a cylinder wall adjacent the piston, wherein substantially all of the fluid within the annular recess is prevented from escaping the annular recess between the piston and the cylinder wall. As an example, engine oil received within a cooling gallery 72 of a piston 22 may be communicated with a cylinder wall 82 as a result of reciprocating motion of the piston 22, which generally urges the engine oil about the interior of the cooling gallery 72 and against cylinder wall 82. Arms 124 preferably permit contact between the engine oil contained within the cooling gallery 72 and cylinder walls 82, and generally prevent the cooling fluid from escaping the cooling gallery 72 by way of a gap between the piston 22 and the cylinder wall 82. Accordingly, cooling fluid is thereby generally kept within the cooling gallery 72, generally with the exception of fluid that is removed by way of apertures 40 or 90. Process 600 may the proceed to step 612.

In process 612, fluid located within a ring groove of the piston is communicated with an aperture formed in the ring groove, the aperture formed in a bottom surface of the ring groove. For example, as described above, fluid that reaches ring groove 50 of piston 22 may be generally evacuated from ring groove 50 by way of aperture 90. Process 600 may then proceed to step 614.

In step 614, the fluid located within the ring groove is communicated with a channel defined by the insert. For example, as described above, fluid that reaches ring groove 50 of piston 22 may be generally drained or evacuated from ring groove 50 into a channel 86 defined by insert 24.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A piston assembly for an internal combustion engine, comprising:

a piston including a ring belt, a skirt, an annular recess disposed between the ring belt and the skirt, and a first surface located along an outer surface of the skirt; and at least one insert configured to be coupled with the piston, the insert including a longitudinal portion and at least one arm, the arm extending laterally from the longitudinal portion and configured to abut the skirt;

wherein the insert is disposed along the first surface and aligned with the piston skirt such that the arm of the insert cooperates with the piston skirt to form a perimeter of the piston assembly, the arm at least partially enclosing the annular recess at the piston skirt.

2. The piston assembly of claim 1, wherein the insert is configured to cooperate with the piston to substantially prevent fluid in the annular recess from flowing out of the annular recess about the perimeter of the piston assembly.

3. The piston assembly of claim 1, wherein the insert is configured to be secured to a wrist pin of the piston.

4. The piston assembly of claim 1, wherein the piston further includes a ring groove having an aperture defined along a bottom surface of the ring groove.

5. The piston assembly of claim 4, wherein the insert further includes a longitudinal channel extending along the longitudinal portion, wherein the aperture allows fluid communication between the ring groove and the longitudinal channel.

6. The piston assembly of claim 1, wherein the piston further includes a second surface and a second insert, the second surface located along an outer surface of the skirt, the second surface being substantially planar, the second insert including a longitudinal portion and at least one arm extending laterally therefrom, the second insert disposed along the second surface and aligned with the piston skirt such that the arm of the second insert cooperates with the arm of the first insert and the piston skirt to form the perimeter of the piston assembly, the arms of the first and second inserts at least partially enclosing the annular recess at the piston skirt.

7. The piston assembly of claim 1, wherein the first surface includes a substantially planar region.

8. The piston assembly of claim 7, wherein the at least one arm includes an arcuate surface.

9. The piston assembly of claim 8, wherein the arcuate surface forms a portion of a generally cylindrical circumference to the piston assembly.

10. The piston assembly of claim 1, wherein the arm is configured to orient the insert relative to the piston.

11. An insert for a piston, comprising:

a longitudinal portion having a first end and a second end, the longitudinal portion positioned such that the first end is adjacent an annular recess of the piston when the second end is positioned adjacent a skirt of the piston; and a pair of opposing arms extending laterally from the longitudinal portion and abuts the piston to orient the longitudinal portion relative to the piston when the second end is positioned adjacent a skirt of the piston;

wherein the longitudinal portion couples the insert with the piston along a bottom surface of a ring belt of the piston, the longitudinal portion defining a channel extending along the longitudinal portion.

12. The insert of claim 11, wherein the channel is in fluid communication with an aperture located along the bottom surface of the ring belt when the second end is positioned adjacent the skirt of the piston.

13. The insert of claim 12, wherein the channel allows fluid communication between a ring groove of the piston adjacent the aperture and a surface of the piston adjacent the skirt of the piston.

14. The insert of claim 11, wherein the arms cooperate with the skirt of the piston when the insert is circumferentially aligned with the piston to form a perimeter about the piston and at least partially enclose the annular recess of the piston.

15. The insert of claim 14, wherein the insert cooperates with the piston to substantially prevent fluid in the annular recess from flowing out of the annular recess along the perimeter of the piston assembly.

16. A method of cooling a piston, comprising the steps of:

providing an annular recess between a ring band of the piston and a skirt of the piston;

coupling an insert to the piston, the insert including a pair of opposing arms extending laterally from a longitudinal portion of the insert;

abutting the skirt with the opposing arms, thereby at least partially enclosing the annular recess of the piston with the arms of the insert; and receiving a cooling fluid within the annular recess.

17. The method of claim 16, further comprising communicating the fluid within the annular recess with a cylinder wall adjacent the piston, wherein substantially all of the fluid within the annular recess is prevented from escaping the annular recess between the piston and the cylinder wall.

18. The method of claim 16, further comprising communicating fluid located within a ring groove of the piston with an aperture formed in the ring groove, the aperture formed in a bottom surface of the ring groove.

19. The method of claim 18, further comprising communicating the fluid located within the ring groove with a channel defined by the insert.

* * * * *